US010414587B2

(12) United States Patent
Wehner et al.

(10) Patent No.: US 10,414,587 B2
(45) Date of Patent: Sep. 17, 2019

(54) AUTOMATICALLY CENTERING LOAD SUPPORT FOR SHUTTLE VEHICLES HAVING A VARIABLE RECEIVING WIDTH

(71) Applicant: Dematic GmbH, Heusenstamm (DE)

(72) Inventors: Matthias Wehner, Offenbach (DE); Michael Becker, Hainburg (DE); Hartwig Reckemeier, Rodgau (DE); Pascal Rehm, Bielefeld (DE)

(73) Assignee: Dematic GmbH, Heusenstamm (DE)

( * ) Notice: Subject to any disclaimer, the term of this patent is extended or adjusted under 35 U.S.C. 154(b) by 191 days.

(21) Appl. No.: 15/652,690

(22) Filed: Jul. 18, 2017

(65) Prior Publication Data
US 2018/0022547 A1 Jan. 25, 2018

(30) Foreign Application Priority Data

Jul. 19, 2016 (DE) ........................ 10 2016 113 245

(51) Int. Cl.
*B65G 1/04* (2006.01)
*B65G 1/06* (2006.01)

(52) U.S. Cl.
CPC ........... *B65G 1/0492* (2013.01); *B65G 1/065* (2013.01)

(58) Field of Classification Search
CPC ..... B65G 1/0492; B65G 1/065; B65G 1/0435
See application file for complete search history.

(56) References Cited

U.S. PATENT DOCUMENTS

| 3,880,299 | A | 4/1975 | Zollinger et al. |
| 5,927,926 | A | 7/1999 | Yagi et al. |
| 6,923,612 | B2 | 8/2005 | Hansl |
| 7,128,521 | B2 | 10/2006 | Hansl |

(Continued)

FOREIGN PATENT DOCUMENTS

| AT | 516410 A4 | 5/2016 |
| CN | 1749131 A | 3/2006 |

(Continued)

OTHER PUBLICATIONS

Machine Translation of JP 2009-286615 from espacenet dated Mar. 21, 2019 (Year: 2009).*

(Continued)

*Primary Examiner* — Mark C Hageman
(74) *Attorney, Agent, or Firm* — Gardner, Linn, Burkhart & Ondersma LLP

(57) ABSTRACT

A single-level rack serving apparatus for transporting load units, which comprises two chassis halves each having a pair of rollers and each having an extendible arm, a storage region between the chassis halves and a connection structure, wherein the chassis halves are connected to one another by the connection structure and travel on running rails by the rollers. The arms serve to pull up or push down load units onto or from the storage region which comprises at least two first and second lateral supporting plates for supportingly carrying the load units. The size of the storage region can be varied by varying the spacing between the arms together with the lateral supporting plates. A further third supporting plate is arranged between the first and second lateral supporting plates such that it supports a load unit centrally from below in the storage region irrespective of the size of the storage region.

20 Claims, 4 Drawing Sheets

(56) References Cited

U.S. PATENT DOCUMENTS

| | | | |
|---|---|---|---|
| 9,522,781 B2 | 12/2016 | Hortig et al. | |
| 9,718,617 B2* | 8/2017 | Koide | B65G 1/0492 |
| 9,908,699 B2* | 3/2018 | Miyagawa | B65G 1/0492 |
| 2003/0185656 A1 | 10/2003 | Hansl | |
| 2006/0245862 A1 | 11/2006 | Hansl et al. | |
| 2009/0074545 A1 | 3/2009 | Lert, Jr. et al. | |
| 2011/0008137 A1 | 1/2011 | Yamashita | |
| 2011/0008138 A1 | 1/2011 | Yamashita | |
| 2011/0142581 A1 | 6/2011 | Freudelsperger | |
| 2015/0081089 A1* | 3/2015 | Kapust | B65G 1/1373 700/218 |
| 2018/0134488 A1* | 5/2018 | Grosse | B65G 1/0435 |

FOREIGN PATENT DOCUMENTS

| | | |
|---|---|---|
| CN | 201385922 Y | 1/2010 |
| CN | 101890711 A | 11/2010 |
| EP | 0733563 A1 | 9/1996 |
| EP | 1422169 A2 | 5/2004 |
| EP | 1772400 A1 | 4/2007 |
| EP | 2030938 A1 | 3/2009 |
| EP | 1631521 B1 | 10/2010 |
| EP | 2272787 A1 | 1/2011 |
| EP | 2318293 B1 | 1/2013 |
| EP | 2526032 B1 | 11/2013 |
| JP | 63165205 | 7/1988 |
| JP | 08175620 | 7/1996 |
| JP | 08175621 | 7/1996 |
| JP | 08324721 | 12/1996 |
| JP | 09048507 A | 2/1997 |
| JP | 09240809 | 9/1997 |
| JP | 10297712 | 11/1998 |
| JP | 11079321 | 3/1999 |
| JP | 2000159307 A | 6/2000 |
| JP | 2000211706 A | 8/2000 |
| JP | 2003048604 A | 2/2003 |
| JP | 2004123240 | 4/2004 |
| JP | 2006096522 A | 4/2006 |
| JP | 2006103873 A | 4/2006 |
| JP | 2007210773 A | 8/2007 |
| JP | 2009286615 A | 10/2009 |
| WO | 03019425 A1 | 3/2003 |

OTHER PUBLICATIONS

Karl-Heinz Dullinger, "Beitrag Tagungsband—BVL Kongress 2008 in Berlin," Version 1.1 (Jul. 23, 2008).

* cited by examiner

AUTOMATICALLY CENTERING LOAD SUPPORT FOR SHUTTLE VEHICLES HAVING A VARIABLE RECEIVING WIDTH

CROSS REFERENCE TO RELATED APPLICATION

The present application claims priority of German patent application Ser. No. DE102016113245.4 filed Jul. 19, 2016.

BACKGROUND AND FIELD OF THE INVENTION

The present invention relates to a single-level rack serving apparatus, a so-called shuttle, for transporting load units.

EP 2 526 032 B1 discloses a shuttle for an automated storage facility, the storage region of which extending between a first and second chassis portion. The second chassis portion can be moved relative to the first chassis portion in order to vary the storage surface. A plurality of plates overlapping in the manner of shingles form the surface of the storage region. The overlapping plates are connected via flexible bands which guarantee a maximum spaced interval and therefore ensure a relatively uniform distribution. This prevents adjacent plates from becoming separated when the spacing is increased. At the same time, the plates can move towards one another if the spaced interval between the chassis portions is reduced.

The arrangement of overlapping plates between the chassis portions and the connection established by flexible bands are complex in terms of design and manufacturing technology.

JP 09-048507 A discloses a shuttle comprising a displaceable storage surface for an automated storage facility, said shuttle comprising two chassis portions and a storage surface arranged therebetween. The first chassis portion is fixed on a body frame which is provided with, in each case, a rack gear on each vehicle side, the second chassis portion is arranged so as to be able to move on the body frame. The storage surface is defined by two supporting plates which are each arranged on the inner side of a chassis portion, in parallel with the chassis portion and perpendicular to the rack gears. The chassis portions and thus also the supporting plates are moved by means of a spacing motor which is connected to two chain wheels by means of an endless chain. These chain wheels move in each case one rack gear and the chassis portion connected to the rack gears.

This design of the displaceable storage surface has the disadvantage that the storage surface is defined only by two supporting plates which are each arranged, at the sides of the storage surface, on the two chassis portions of the vehicle. This can cause the load unit or the article to sag and thus render the transfer of articles from the shuttle to the intended storage shelf (and the other way round) more difficult or can even cause the load to become damaged if the goods to be loaded are unstable. Also, in the case of an inaccuracy in the spaced interval between the two chassis portions and thus the supporting plates or in the case of the load unit having an irregular shape, a lack of support in the centre of the article-receiving region can even cause the load unit or article to slide through. Corresponding problems can also occur during transport.

AT 516410 A4 discloses a shuttle in which in addition to lateral unit load supports allocated to the telescopic arms, a further third unit load support is provided in order to support unit loads additionally from below. It is not disclosed how this third unit load support is designed or arranged.

SUMMARY OF THE INVENTION

The object of the present invention is to produce a shuttle having a flexibly adjustable article-receiving region which has a structurally simplified but still well-defined and stable storage surface. A single-level rack serving apparatus, or shuttle, for transporting load units comprises two chassis halves each having a pair of rollers and each having an extendible arm, a storage region between the chassis halves and a connection structure, wherein the chassis halves are connected to one another by the connection structure, travel on running rails by means of the rollers, the arms serve to pull up or push down load units onto or from the storage region which comprises at least two first and second lateral supporting plates for supportingly carrying the load units, wherein the size of the storage region can be varied by varying the spacing between the arms together with the lateral supporting plates.

In accordance with an embodiment of the present invention, a single-level rack serving apparatus includes a storage region that is designed in a stable and structurally simplified manner by virtue of the fact that a further third flat supporting plate is arranged and configured between the first and second lateral supporting plates such that it supports a load unit centrally from below in the storage region irrespective of the size of the storage region, wherein the supporting plates never overlap.

This has the advantage that a complex arrangement of a plurality of overlapping plates and the connection thereof via movable bands to provide a storage region are omitted. The storage region is formed merely by e.g. three supporting plates which can be arranged on two lateral holding rails of a connection structure. Therefore, a storage region is provided, of which the storage elements, i.e. supporting plates, are arranged more variably than when a closed storage region is provided by means of overlapping storage elements since a smaller minimum receiving width can be achieved because the plates do not have to be pushed one inside the other. Furthermore, variability of the minimum receiving width to be achieved can be easily achieved by a combination of different carrying plate widths.

Since the third supporting plate supports a load unit centrally irrespective of the size of the storage region, i.e. in other words is always arranged centrally, it is possible to store or transport the load unit in a particularly secure and effective manner irrespective of the size of the load unit.

Single-level rack serving apparatuses, so-called shuttle vehicles, are apparatuses for automatically loading and unloading racks in a storage system, wherein these typically serve only one single storage rack level or a few levels arranged one on top of the other. The shuttles move in a lane along a storage rack in order to remove load units from storage locations or to place said units into storage locations. The shuttles generally have a first and a second chassis portion, i.e. a front and end part, and between the chassis portions have a storage region (storage surface) for receiving the load unit or articles. The articles are transferred by a pair of telescopic arms onto the storage surface or are transferred from the storage surface into the storage location, for which reason the telescopic arms generally have entrainers which can be pivoted in and out.

In order to reliably transfer and transport load units of a different size and shape, i.e. load units having different dimensions, it is helpful if the dimensions of the storage surface can be varied accordingly. This can be achieved by way of a variable spaced interval between the two arms which at the same time guide the load as it is being received and released.

Three supporting plates serve to provide stable storage of the load units via a central support without the risk of the load units sagging or sliding down.

A further advantage is that the third supporting plate is arranged by way of a connection between the first and second lateral supporting plates such that it is always arranged centrally when the size of the storage region is increased or decreased.

Therefore, irrespective of the size of the load unit and of the size of the storage region, the load unit is supported laterally by two supporting plates and centrally by the third supporting plate. This prevents the load unit from sagging or sliding through between the two outer supporting plates. This is an advantage over shuttles which have only two supporting plates. The connection ensures that the third supporting plate is arranged centrally, irrespective of how displacement and/or adjustment of the spaced interval between the telescopic arms is/are effected, in particular even when only one of the telescopic arms moves in comparison with the other stationary telescopic arm.

A further improvement is provided by virtue of the fact that the connection comprises a tripartite articulated linkage consisting of three linkage members.

As a result, the connection between supporting plates can be compressed in a space-saving and flexible manner without any obstruction, if the supporting plates are pushed together in order to reduce the size of the storage region, and at the same time has sufficient stability to guarantee a uniform spaced interval between the supporting plates.

In accordance with a further aspect of the invention, provision is made that the three linkage members are connected at a first connection point to a first supporting plate, are connected at a second connection point to a second supporting plate and are connected at a third connection point to a third supporting plate and a first joint is arranged between the first and second connection point and a second joint is arranged between the second and third connection point for the mobility of the three linkage members. Therefore, it is easily possible to ensure that the third supporting plate is arranged centrally, since the forces which are effective during displacement are compensated for (no lateral forces). A separate drive is not required for changing the position of the central supporting plate.

The solution has the further advantage that there may be no height difference between the left and right side, since the previous solution pushed the plates one inside the other and therefore the plates overlap in the manner of shingles. Accordingly, the storage region formed by the three supporting plates may always be flat and supports a load unit from below at three places. In a particular embodiment, only three supporting plates are preferably ever provided.

In a further embodiment in accordance with the present invention, provision is made that the first lateral supporting plate is allocated to the first arm and the second lateral supporting plate is allocated to the second arm. This means that when the spaced interval between the two arms is changed, the two lateral supporting plates also move and therefore a load unit is supported on its sides irrespective of its size and of the size of the storage surface, i.e. storage stability is maximised.

In a further embodiment, provision is made that when the spacing between the arms is varied by means of a movement of the first arm relative to the unmoved second arm the first lateral storage plate and the central supporting plate are movable or when the spacing between the arms is varied by means of a movement of the second arm relative to the first unmoved arm, the second lateral supporting plate and the central supporting plate are designed to be movable.

In accordance with another aspect of the present invention, provision is also made that when the spacing between the arms is varied by means of a movement of the first arm and of the second arm towards one another or away from one another, the first lateral supporting plate and the second lateral supporting plate are designed to be movable.

As a result, the support of the loading unit can be flexibly adapted since the supporting plates are connected to one another by means of the three linkage members which are movable about the joints and therefore when one of the two arms is moved relative to the other, the resulting movement of one of the two lateral supporting plates is transmitted to the linkage. This then ensures a uniform spaced interval between the supporting plates. An exemplified embodiment of the invention will be explained in greater detail hereinafter with reference to the drawings.

DESCRIPTION OF THE PREFERRED EMBODIMENTS

Figure 1:
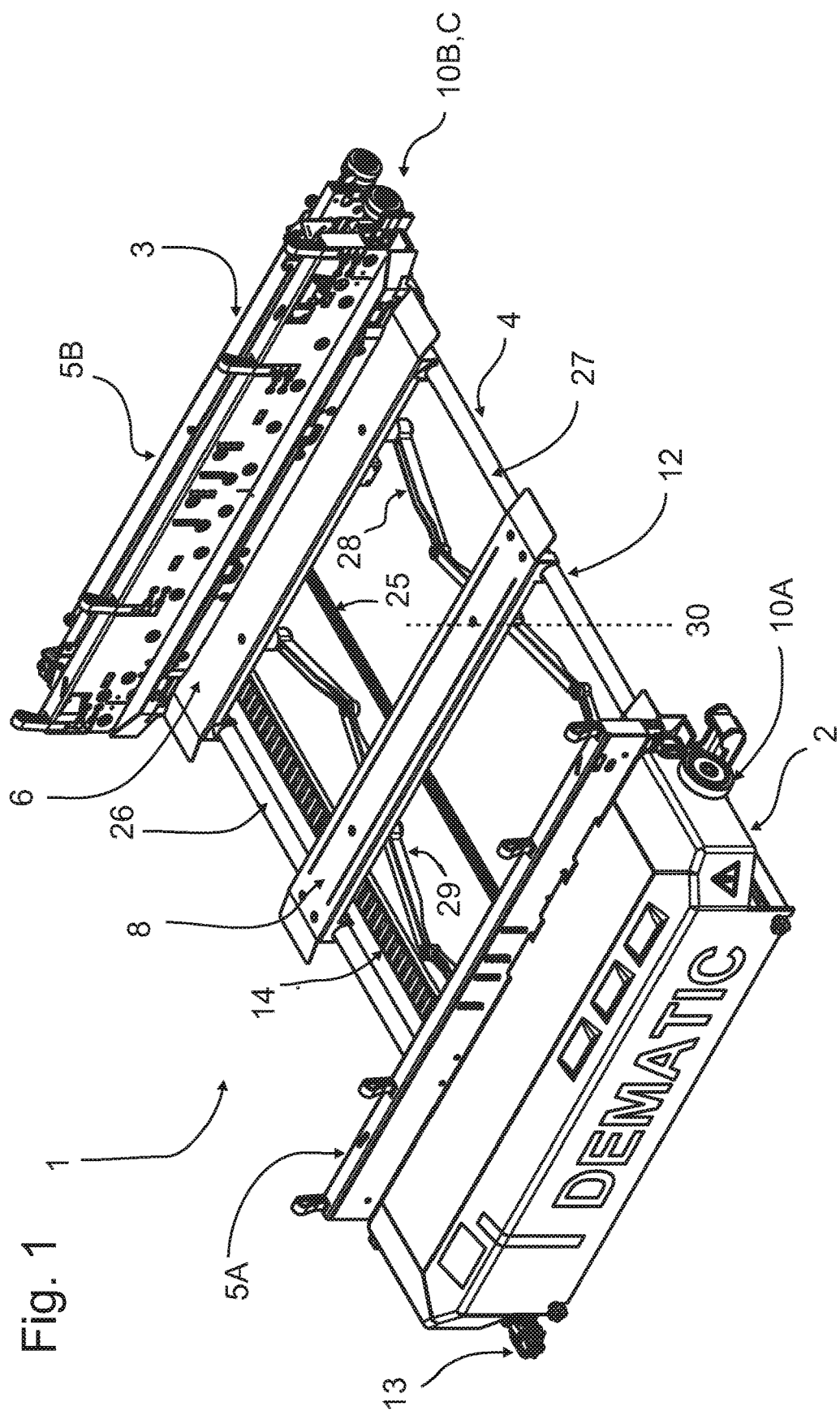
FIG. 1 shows a perspective view of a shuttle having automatically centring load support and a maximum receiving width.

FIG. 1 shows a perspective view of a single-level rack serving apparatus or shuttle 1 having automatically centring load support, which consists of two chassis portions, namely a first chassis portion 2 and a second chassis portion 3. The two chassis halves 2 and 3 are connected to one another by way of two lateral (as seen in the direction of travel) holding rails (carrier pipes) 26 and 27 which are arranged on one vehicle side and form part of a connection structure 4, which may alternatively be referred to as a connector link.

Arranged between the chassis portions 2, 3 is a storage region 12 for receiving the load units to be transported. The storage region 12 comprises two lateral supporting plates 6 and 7 (only supporting plate 6 can be seen in FIG. 1) and a central supporting plate 8 which serve to support the load units arranged in the storage region. The supporting plates 6, 7, 8 are carried by the holding rails 26 and 27 are oriented transversely thereto. Supporting plates 6 and 8 slide on the holding rails 26 and 27.

The supporting plates 6, 7 and 8 of the storage region 12, i.e. the surface on which a load unit is transported, comprises two arms 5A, B which can be extended telescopically and by means of which a load unit can be transferred from a storage location to the storage region 12 or vice versa from the storage region to a storage location, for which reason they each have 4 entrainers which can be pivoted in and out. Each arm 5 is allocated to a chassis portion 2, 3. The telescopic arms 5A, B are arranged on the lateral edge of the storage region and are each allocated one of the lateral supporting plates 6, 7.

The spaced interval between the arms 5A, B can be varied in order to adapt the storage region of the load unit, for which reason a driven shaft 25 is arranged centrally below the storage region 12 and is driven by a spacing motor 24.

The shaft 25 engages into the second arm 5B or into a threaded bush provided in the lower support structure thereof (toothing engages into spline shaft) and, during rotation, thus displaces the arm 5B in the spaced interval with respect to the first arm 5A on the first chassis portion 2. When the arm 5B moves, the allocated supporting plate 6 and 8 also moves.

A current and data supply for the shuttle 1 is guaranteed by means of a sliding contact 13 on the first chassis portion 2, whereas a data and current transfer to the second chassis portion 3 takes place via a power track chain 14 between the two chassis portions.

The shuttle 1 also has lateral rollers 10 which allow it to travel in a lane (not illustrated) along a storage rack in a high bay storage racking. On the front chassis 2, the rollers are drive rollers 10A, whereas the rollers 10C on the rear chassis are only passive running rollers. A pair of rollers 10B is also allocated to the movable second arm 5B so that said arm is also supported in different positions, in particular if it has been displaced significantly in the direction of the first arm 5A by varying the width of the storage region. The shuttle 1 is guided on a guide rail (not illustrated) by two guide rollers 11 which on one side are mounted externally on the second chassis portion 3 of the vehicle.

Figure 2:
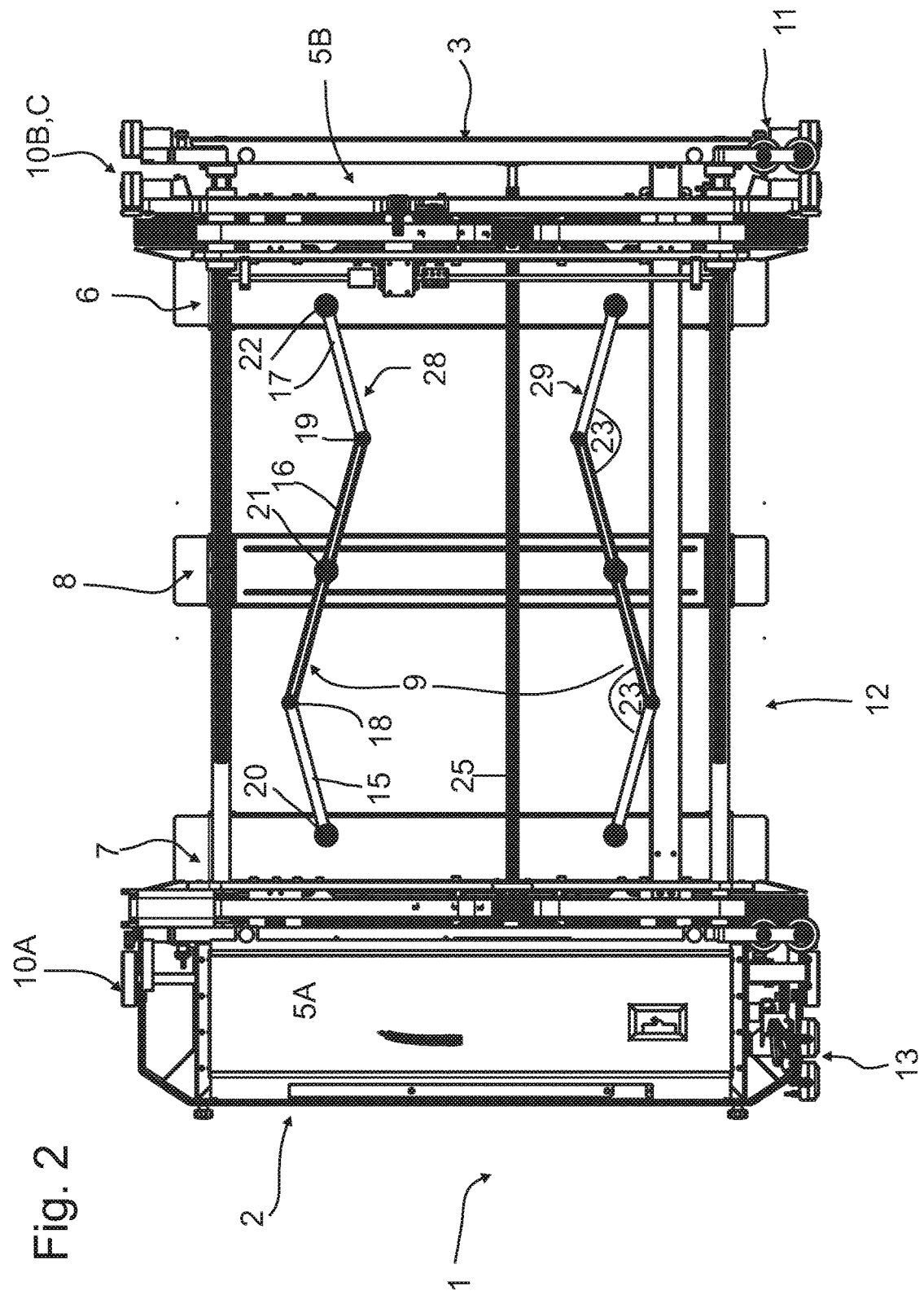
FIG. 2 shows a view of the shuttle of FIG. 1 from below.

FIG. 1 illustrates the storage region 12 at its maximum width. FIG. 2 shows a corresponding view of the shuttle 1 from below (with maximally extended second chassis portion 3).

Provided below the supporting plates 6, 7 and 8 is a connector or connection 9 for centring the central supporting plate 8. In the present case, the connection 9 consists of a first linkage 28 and a second linkage 29. However, the connection 9 can naturally also be designed in the form of one connection or multiple connections (the linkages 15 and 16 or 16 and 17 act depending on the direction in which the carrier plates are displaced).

The linkages 28 and 29 each comprise three members 15, 16 and 17 which are connected by means of two joints 18 and 19 in each case. The linkages 28, 29 are formed in a mutually identical but mirror-inverted manner on the notional longitudinal centre line of the shuttle. The linkages 28 and 29 are each connected in an articulated manner to the three supporting plates 6, 7 and 8 at three points 20, 21 and 22, thus permitting a rotation of the three linkage members 15, 16 and 17 about the respective connection point 20, 21 or 22 or about the respective axis of rotation 30 (only one shown by way of example) by means of a connection point 20, 21 or 22 (see FIG. 1).

By way of the connection of the linkages in the three connection points 20, 21 and 22 to the supporting plates 6, 7 and 8, the supporting plates are always located at the same spaced interval with respect to one another when the size of the storage region 12 is variable, i.e. the central supporting plate 8 is arranged in an automatically centred manner between the lateral supporting plates 6 and 7.

Figure 3:
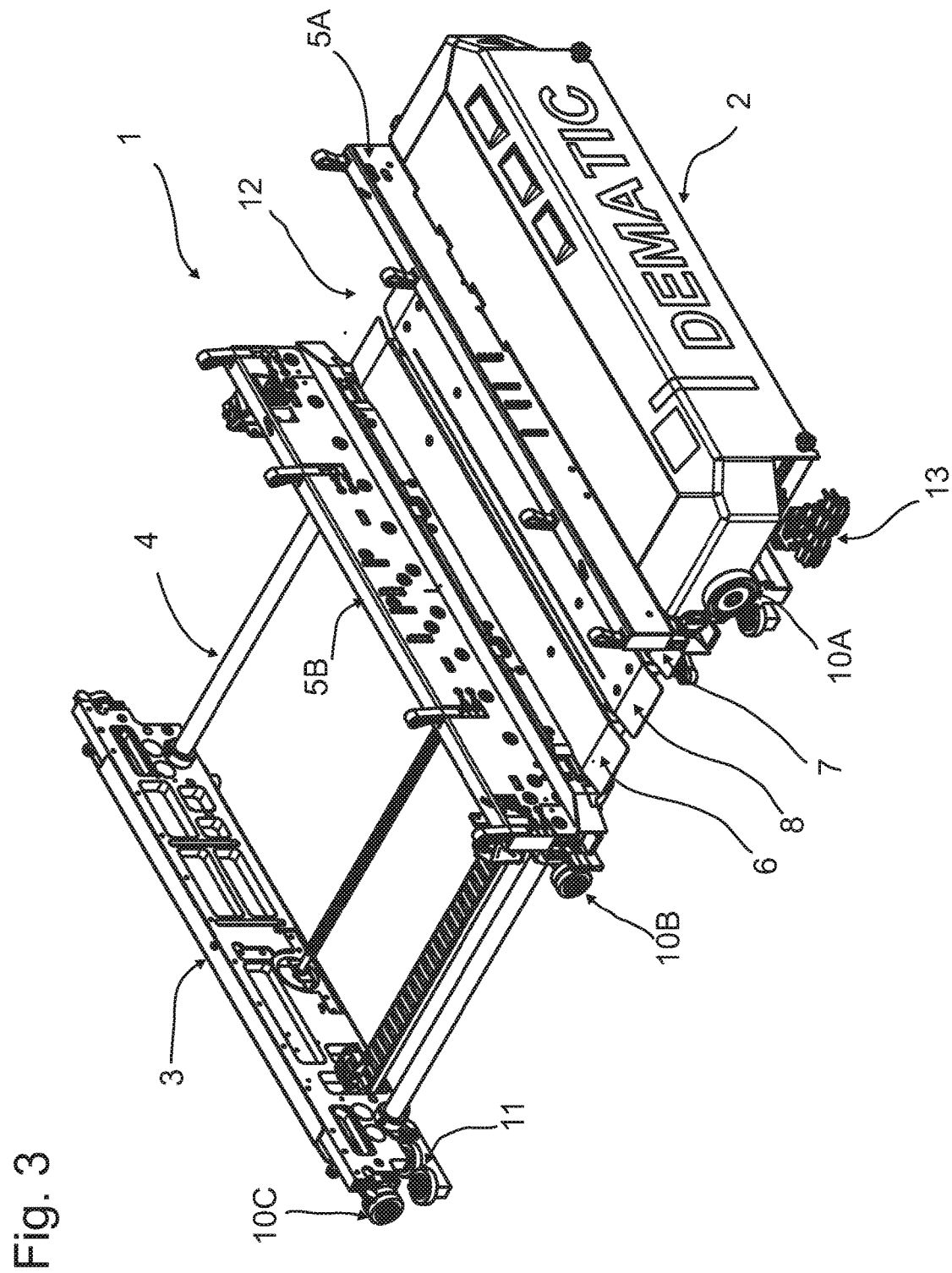
FIG. 3 shows a perspective view of the shuttle of FIG. 1 with a minimum receiving width.

In the extended state of the shuttle 1 as illustrated in FIG. 2, the linkages 28 and 29 are not completely elongate. This means that the linkage members 15 and 16 or 16 and 17 each form an obtuse angle 23 of about 170 degrees FIG. 3 illustrates a perspective view of the shuttle 1 with a reduced storage region 12 or displaced second arm 5b. This is the minimum-width storage region 12, defined by the directly mutually adjoining supporting plates 6, 7 and 8.

Figure 4:
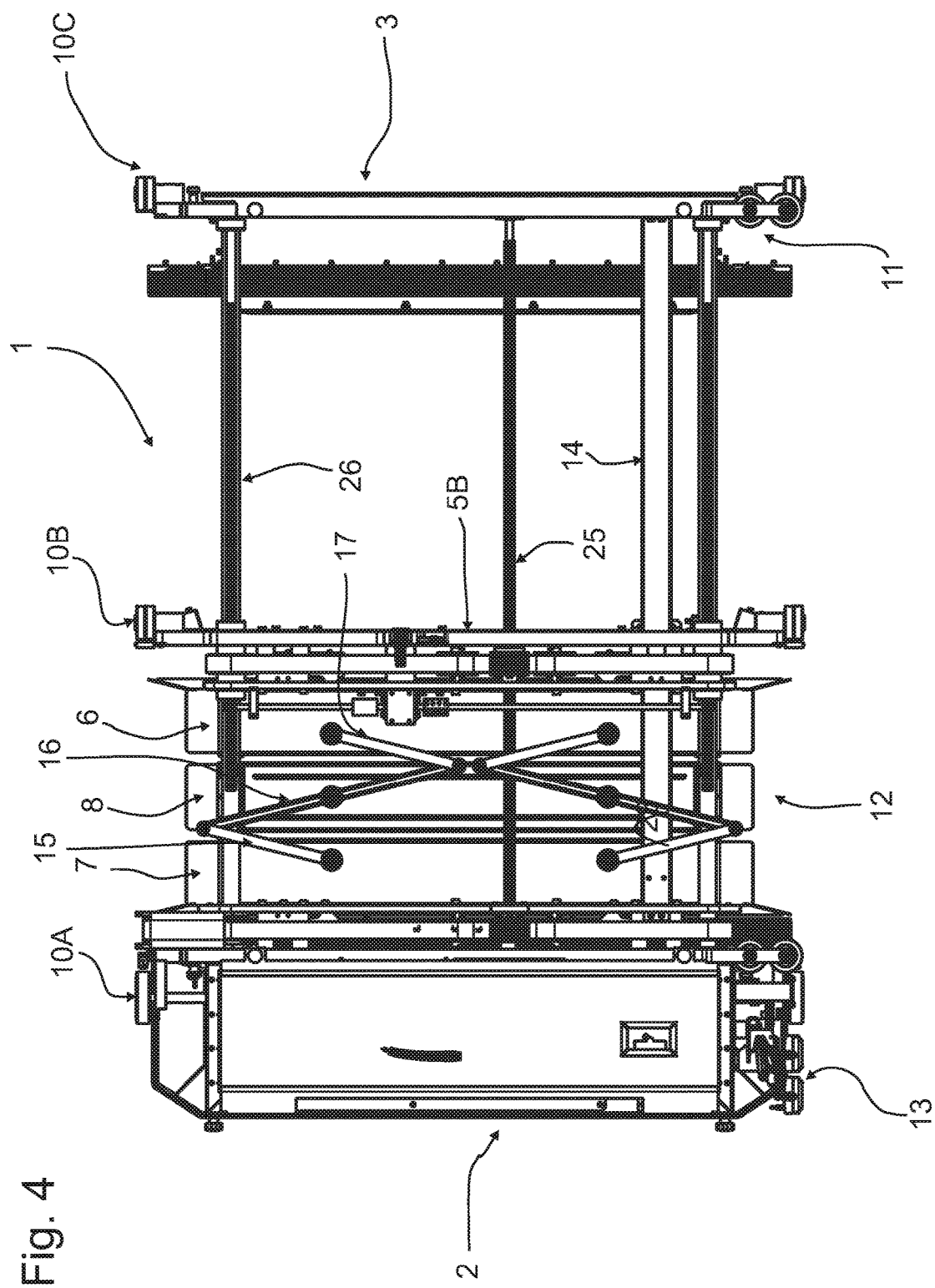
FIG. 4 shows a view of the shuttle of FIG. 3 from below.

As can be seen in FIG. 4, the linkages 28 and 29 are in a folded state when the storage region 12 is at its minimum size. The linkage members 15, 16 and 17 are bent at an acute angle at the joints 18 and 19, i.e. the linkage members 15 and 16 or 16 and 17 each form an acute angle 23.

It is apparent that by virtue of the displacement of the second arm 5B relative to the first arm 5A, the linkage 28, 29 causes the central supporting plate 8 "to be entrained" by means of the displacement of the second supporting plate 7 which is effected simultaneously, which is made possible by means of the articulated interconnection of the linkage members.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A single-level rack serving apparatus for transporting load units, which comprises:
   two chassis halves comprising a first chassis half and a second chassis half with each having a pair of rollers and each having an extendible arm, a storage region between the chassis halves and a connection structure, wherein the chassis halves are connected to one another by the connection structure and travel on running rails via the rollers, and wherein the arm of the first chassis half comprises a first arm and the arm of the second chassis half comprises a second arm and the arms serve to pull load units onto the storage region or push load units from the storage region;
   said first chassis half comprises at least a first lateral flat supporting plate and said second chassis half comprises at least a second lateral flat supporting plate for supportingly carrying the load units, wherein the size of the storage region can be varied by varying the spacing between the arms together with the lateral supporting plates, and wherein a further third flat supporting plate is arranged and configured to be moveably supported between the first and second lateral supporting plates such that said third flat supporting plate has the same spaced interval with respect to said first and second lateral flat supporting plates in order to support a load unit centrally from below in the storage region irrespective of the size of the storage region and without overlap of the supporting plates.

2. The single-level rack serving apparatus as claimed in claim 1, wherein the third supporting plate is arranged by said connection structure between the first and second lateral supporting plates such that said third support plate is always arranged centrally when the size of the storage region is increased or decreased.

3. The single-level rack serving apparatus as claimed in claim 2, wherein when the spacing between the first and second arms is varied via a movement of the first arm relative to the second unmoved arm, the first lateral storage plate and the central supporting plate are designed to be movable or when the spacing between the first and second arms is varied via a movement of the second arm relative to the first unmoved arm, the second lateral supporting plate and the central supporting plate are designed to be movable.

4. A single-level rack serving apparatus as claimed in claim 2, wherein when the spacing between the first and second arms is varied via a movement of the first arm and of the second arm towards one another or away from one another, the first lateral supporting plate and the second lateral supporting plate are designed to be movable.

5. The single-level rack serving apparatus as claimed in claim 2, wherein the first lateral supporting plate is allocated to the first arm and the second lateral supporting plate is allocated to the second arm.

6. The single-level rack serving apparatus as claimed in claim 5, wherein when the spacing between the first and second arms is varied via a movement of the first arm relative to the second unmoved arm, the first lateral storage plate and the central supporting plate are designed to be movable or when the spacing between the first and second arms is varied via a movement of the second arm relative to the first unmoved arm, the second lateral supporting plate and the central supporting plate are designed to be movable.

7. A single-level rack serving apparatus as claimed in claim 5, wherein when the spacing between the first and second arms is varied via a movement of the first arm and of the second arm towards one another or away from one another, the first lateral supporting plate and the second lateral supporting plate are designed to be movable.

8. The single-level rack serving apparatus as claimed in claim 1, wherein the first lateral supporting plate is allocated to the first arm and the second lateral supporting plate is allocated to the second arm.

9. The single-level rack serving apparatus as claimed in claim 1, wherein when the spacing between the first and second arms is varied via a movement of the first arm and of the second arm towards one another or away from one another, the first lateral supporting plate and the second lateral supporting plate are designed to be movable.

10. A single-level rack serving apparatus for transporting load units, which comprises:
two chassis halves comprising a first chassis half and a second chassis half with each having a pair of rollers and each having an extendible arm, a storage region between the chassis halves and a connection structure, wherein the chassis halves are connected to one another by the connection structure and travel on running rails via the rollers, and wherein the arm of the first chassis half comprises a first arm and the arm of the second chassis half comprises a second arm and the arms serve to pull load units onto the storage region or push load units from the storage region;
said first chassis half comprises at least a first lateral flat supporting plate and said second chassis half comprises at least a second lateral flat supporting plate for supportingly carrying the load units, wherein the size of the storage region can be varied by varying the spacing between the arms together with the lateral supporting plates, and wherein a further third flat supporting plate is arranged and configured between the first and second lateral supporting plates such that said third flat supporting plate supports a load unit centrally between said first and second lateral flat supporting plates from below in the storage region irrespective of the size of the storage region and without overlap of the supporting plates, wherein the third supporting plate is arranged by said connection structure between the first and second lateral supporting plates such that said third support plate is always arranged centrally when the size of the storage region is increased or decreased, wherein the connection structure comprises a tripartite articulated linkage consisting of three linkage members.

11. The single-level rack serving apparatus as claimed in claim 10, wherein the three linkage members are connected at a first connection point to the first supporting plate, are connected at a second connection point to the second supporting plate and are connected at a third connection point to the third supporting plate and a first joint is arranged between the first and second connection point and a second joint is arranged between the second and third connection point for the mobility of the three linkage members.

12. The single-level rack serving apparatus as claimed in claim 11, wherein the first lateral supporting plate is allocated to the first arm and the second lateral supporting plate is allocated to the second arm.

13. The single-level rack serving apparatus as claimed in claim 12, wherein when the spacing between the first and second arms is varied via a movement of the first arm relative to the second unmoved arm, the first lateral storage plate and the central supporting plate are designed to be movable or when the spacing between the first and second arms is varied via a movement of the second arm relative to the first unmoved arm, the second lateral supporting plate and the central supporting plate are designed to be movable.

14. A single-level rack serving apparatus as claimed in claim 13, wherein when the spacing between the first and second arms is varied via a movement of the first arm and of the second arm towards one another or away from one another, the first lateral supporting plate and the second lateral supporting plate are designed to be movable.

15. The single-level rack serving apparatus as claimed in claim 10, wherein the first lateral supporting plate is allocated to the first arm and the second lateral supporting plate is allocated to the second arm.

16. The single-level rack serving apparatus as claimed in claim 15, wherein when the spacing between the first and second arms is varied via a movement of the first arm relative to the second unmoved arm, the first lateral storage plate and the central supporting plate are designed to be movable or when the spacing between the first and second arms is varied via a movement of the second arm relative to the first unmoved arm, the second lateral supporting plate and the central supporting plate are designed to be movable.

17. A single-level rack serving apparatus as claimed in claim 15, wherein when the spacing between the first and second arms is varied via a movement of the first arm and of the second arm towards one another or away from one another, the first lateral supporting plate and the second lateral supporting plate are designed to be movable.

18. The single-level rack serving apparatus as claimed in claim 10, wherein when the spacing between the first and second arms is varied via a movement of the first arm relative to the second unmoved arm, the first lateral storage plate and the central supporting plate are designed to be movable or when the spacing between the first and second arms is varied via a movement of the second arm relative to the first unmoved arm, the second lateral supporting plate and the central supporting plate are designed to be movable.

19. A single-level rack serving apparatus as claimed in claim 10, wherein when the spacing between the first and second arms is varied via a movement of the first arm and of the second arm towards one another or away from one another, the first lateral supporting plate and the second lateral supporting plate are designed to be movable.

20. A single-level rack serving apparatus for transporting load units, which comprises:
two chassis halves comprising a first chassis half and a second chassis half with each having a pair of rollers and each having an extendible arm, a storage region between the chassis halves and a connection structure, wherein the chassis halves are connected to one another by the connection structure and travel on running rails via the rollers, and wherein the arm of the first chassis half comprises a first arm and the arm of the second chassis half comprises a second arm and the arms serve to pull load units onto the storage region or push load units from the storage region;

said first chassis half comprises at least a first lateral flat supporting plate and said second chassis half comprises at least a second lateral flat supporting plate for supportingly carrying the load units, wherein the size of the storage region can be varied by varying the spacing between the arms together with the lateral supporting plates, and wherein a further third flat supporting plate is arranged and configured between the first and second lateral supporting plates such that said third flat supporting plate supports a load unit centrally between said first and second lateral flat supporting plates from below in the storage region irrespective of the size of the storage region and without overlap of the supporting plates wherein when the spacing between the first and second arms is varied via a movement of the first arm relative to the second unmoved arm, the first lateral storage plate and the central supporting plate are designed to be movable or when the spacing between the first and second arms is varied via a movement of the second arm relative to the first unmoved arm, the second lateral supporting plate and the central supporting plate are designed to be movable.

\* \* \* \* \*